Aug. 21, 1923.

M. STEEL

CAMPING BED FOR AUTOMOBILES

Filed June 27, 1921

1,465,925

INVENTOR.
Marjorie Steel
BY
Hazard & Miller
ATTORNEYS.

Patented Aug. 21, 1923.

1,465,925

UNITED STATES PATENT OFFICE.

MARJORIE STEEL, OF LOS ANGELES, CALIFORNIA.

CAMPING BED FOR AUTOMOBILES.

Application filed June 27, 1921. Serial No. 480,625.

*To all whom it may concern:*

Be it known that I, MARJORIE STEEL, a citizen of the United States, residing at Los Angeles, in the county of Los Angeles and State of California, have invented new and useful Improvements in Camping Beds for Automobiles, of which the following is a specification.

My invention relates generally to automobile tonneau construction, and more particularly to a folding seat, the principal object of my invention being to provide a relatively simple and practical folding seat structure that may be unfolded and shifted into position to form within the tonneau of the vehicle, a bed or couch and which provision is especially desirable where vehicle owners are making extended trips or tours in their cars.

Further objects of my invention are to provide a folding seat structure that may be produced and installed with relatively little expense, to provide a structure that may be readily shifted from one position to another, and, further, to provide a folding seat for motor vehicles that will be very effective in performing its intended functions.

With the foregoing and other objects in view, my invention consists in certain novel features of construction and arrangement of parts that will be hereinafter more fully described and claimed, and illustrated in the accompanying drawings, in which:

Referring by numerals to the accompanying drawings, which illustrate a practical embodiment of my invention, 10 designates the floor structure of the tonneau of the vehicle, 11 the base portion or body of the front seat, 12 the base portion or body of the rear seat, 13 the rear seat cushion, 14 the rear seat back, and 15 the front seat back.

Figure 1:
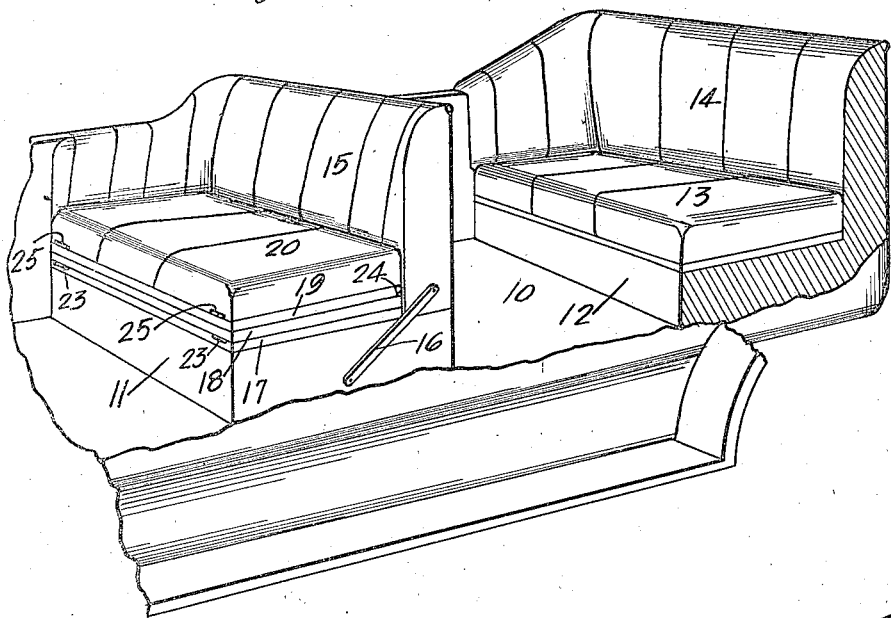
Fig. 1 is a perspective view of the tonneau portion of a motor vehicle of the passenger type, and showing the same equipped with a folding seat of my improved construction.

In accordance with my invention this front seat back 15 is a separate and independent structure, and when properly positioned on the front seat base or body, the lower portion of the seat back rests directly on top of the rear portion of said base or body 11 as illustrated in Fig. 1.

The lower portions of the ends of the body or framework of the front seat back 15 are connected to the intermediate portions of the ends of the front seat base 11 by parallel links 16, the ends thereof being pivotally connected to the base 11 and back 15, in order that the latter may be swung forwardly so as to occupy a vertical position on top of the front portion of said base or body 11.

Figure 4:
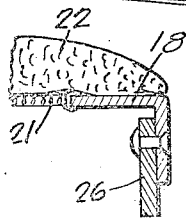
Fig. 4 is an enlarged vertical section taken on the line 4—4 of Fig. 2.

Removably positioned on top of the front seat base or body 11 is a folding structure, comprising a bottom panel 17, an intermediate panel 18, a top panel 19, and a front seat cushion structure 20. Each of the panels 17, 18 and 19 is preferably formed of a substantially rectangular frame made up of angle iron and each frame carrying a section of woven wire 21, preferably of the type utilized in the manufacture of bed bottoms, and if desired each frame and the section of woven wire carried thereby may be suitably padded on top as designated by 22 (Fig. 4.)

The front edge of the bottom frame or panel 17 is connected, by suitable hinges 23, to the corresponding edge of the top panel 19. The front edge of the top panel 19 is connected by suitable hinges 25 to the front lower edge of the front seat cushion 20.

Figure 2:
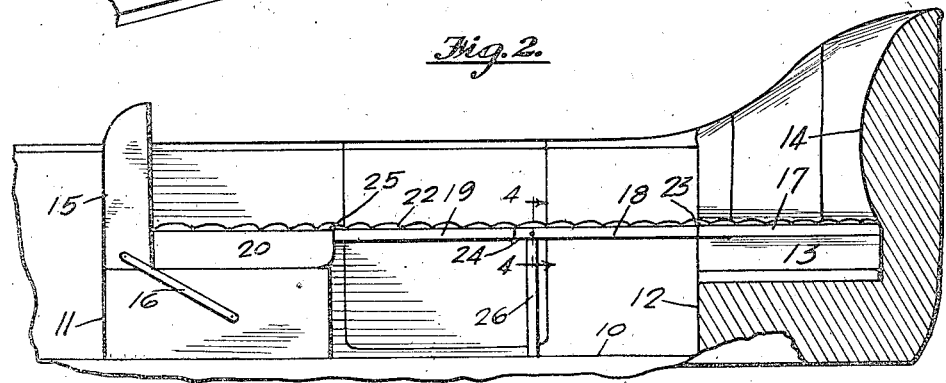
Fig. 2 is an elevational view of the tonneau of a vehicle, with parts broken away and showing my improved folding seat structure unfolded and the parts thereof shifted into position to form a bed or couch.

Pivotally connected to the side rails of the intermediate frame 18, adjacent to the front edge thereof, are legs or supporting members 26 which normally occupy positions against the inner faces of the end rails of said frame 18 and which are adapted to swing downwardly into vertical positions as illustrated in Fig. 2, to form a support for the frames or panels 18 and 19 when the same are shifted into position to form a bed or couch.

Figure 3:
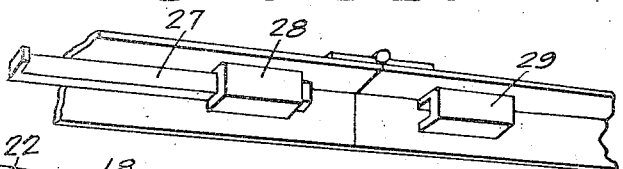
Fig. 3 is a perspective view of portions of the side rails of a pair of the folding frames associated with the seat, and showing the means utilized for locking said rails to each other.

In order to maintain the folding frames or panels 17, 18 and 19 and the front seat cushion 20 in horizontal alinement when shifted into position to form a bed, suitable latching means may be arranged between the side rails of panels 17 and 18, and between the side rails of panel 19 and the side rails of the frame of cushion 20, and such device may be of the form illustrated in Fig. 3, wherein a bolt such as 27 is arranged for sliding movement through a fixed sleeve 28 and the forward end portion of said bolt being adapted to engage in a socket or keeper such as 29 that is fixed on the end portion of the adjacent side rail.

Obviously these locking devices are arranged on the side rails of the panels 17, 18 and 19 and on the side rails of the frame of cushion 20 adjacent to the hinges 23 and 25.

Under normal conditions or while the folding structure is folded and in position to form the front seat of the vehicle, the various parts of the structure occupy the positions as illustrated in Fig. 1, and when it is desired to unfold the structure to form a bed bottom within the tonneau, the cushion 20 with attached panels 17, 18 and 19 is removed from the base 11 and the front seat back 15 is swung over into vertical position at the front side of the front seat base 11.

Cushion 20 is now inverted so that the top or cushioned surface thereof may be positioned on the top of the front seat base 11 to the rear of the shifted front seat back 15, and the frames or panels 17, 18 and 19 are now unfolded and swung into a substantially horizontal plane with the bottom frame or panel 17 resting directly on top of the rear seat cushion 13.

Legs 26 are now swung downwardly to support the adjacent inner edges of the frames or panels 18 and 19, and the locking rods 27 are shifted so as to engage the sockets or keepers 29 thereby locking the adjacent edges of the frames or panels 17 and 18 and panel 19 and the frame of cushion 20 against downward sagging movement. Thus a substantial bed bottom is produced within the tonneau of the vehicle, and, with the addition of suitable padding, a convenient and comfortable bed is provided.

A folding seat and bed structure of my improved construction possesses superior advantages in point of simplicity, durability and general efficiency and affords comfort and convenience to persons driving their cars on extended trips or tours.

Obviously minor changes in the size, form and construction of the various parts of my improved folding seat and bed structure may be made and substituted for those herein shown and described without departing from the spirit of my invention, the scope of which is set forth in the appended claim.

I claim as my invention:

The combination with a vehicle having a rear seat base, a rear seat back rigid with the rear seat base, a rear seat upon the rear seat base, and a front seat base, of a front seat back adapted to rest loosely upon the front seat base, links connecting the front seat back to the front seat base so that the front seat back may be stepped from the rear side of the base to the front side of the base, a front seat cushion adapted to be turned bottom upwardly upon the front seat base, a panel hingedly connected to the cushion, a second panel hingedly connected to the first panel, a third panel hingedly connected to the second panel and folding legs adapted to support the meeting sides of the first and second panels and the third panel adapted to rest upon the rear seat cushion, and bolts for latching the panels in a straight line so as to form a bed, and said panels being adapted to fold upon each other and be positioned under the front seat cushion when the bed is out of use.

In testimony whereof I have signed my name to this specification.

MARJORIE STEEL.